C. ARNONE.
SHAVING CUP.
APPLICATION FILED AUG. 4, 1909.
970,779.
Patented Sept. 20, 1910.
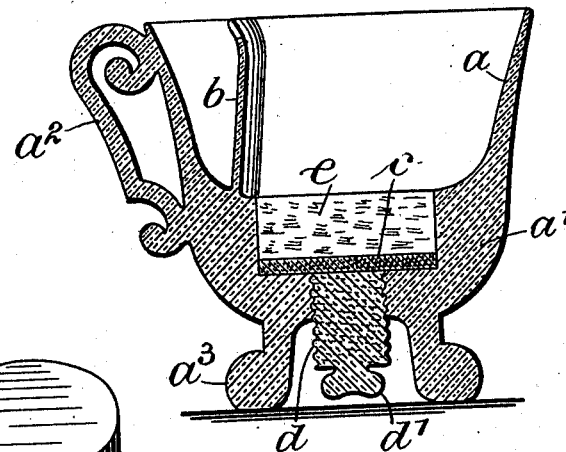
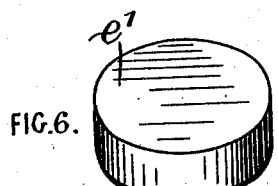
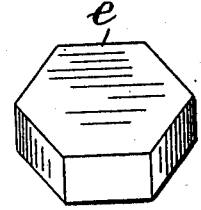
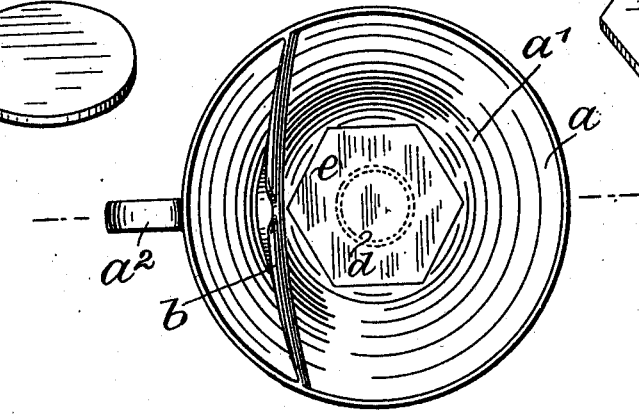
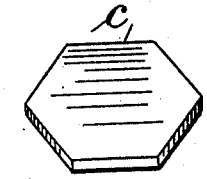
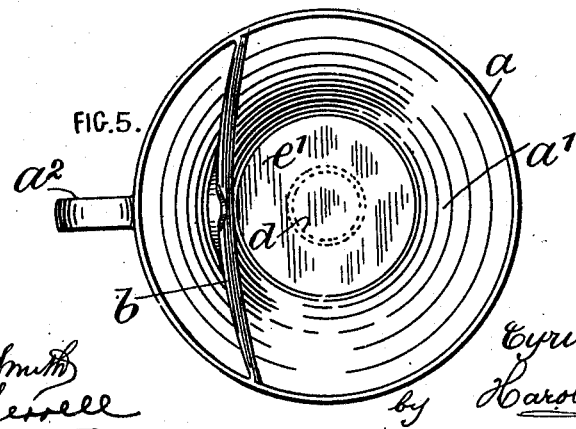

UNITED STATES PATENT OFFICE.

CYRUS ARNONE, OF NEW YORK, N. Y.

SHAVING-CUP.

970,779.

Specification of Letters Patent. Patented Sept. 20, 1910.

Application filed August 4, 1909. Serial No. 511,107.

*To all whom it may concern:*

Be it known that I, CYRUS ARNONE, a citizen of the United States, residing at the borough of Manhattan, city, county, and State of New York, have invented an Improvement in Shaving-Cups, of which the following is a specification.

My invention relates to a shaving cup of vitrified material, and the object of my invention is to provide such a cup with a receptacle in the base thereof to hold a cake of soap where the upper surface of the soap will be even with the bottom of the cup, and with means for raising the soap as used to maintain such position.

In carrying out my invention, the base of the cup is thickened, or in other words, the base is made preferably thicker than the side walls, and said base is perforated and the perforation off-set at about the center thereof; the upper part of the perforation receiving a slab of vitrified material of corresponding outline and also a cake of soap; the lower part of the perforation being circular and interiorly threaded so as to receive a cylindrical exteriorly threaded body or cylinder adapted to move vertically therethrough and in moving so to raise the slab of vitrified material and the cake of soap, so that the soap as it is used may be raised in this manner so as to keep the surface even with the bottom of the cup. Furthermore, the fact that the cup and the slab and the threaded cylinder are all of vitrified material and separable from one another, makes it possible to wash and thoroughly cleanse all the parts and keep them in a sweet and wholesome condition, and this may be done and should be done before the insertion of a fresh cake of soap.

In the drawing Figure 1 is a vertical section and Fig. 2 a plan representing the device of my invention. Fig. 3 is a perspective representing the cake of soap and Fig. 4 is a perspective view representing the slab of vitrified material. Fig. 5 is a plan representing a form of my invention. Fig. 6 is a perspective of a round cake of soap and Fig. 7 a perspective of a round slab of vitrified material associated with the form of invention shown in Fig. 5.

Similar letters of reference denote similar parts in all the figures.

With reference to the cup, $a$ represents the sides increasing in thickness by preference from the upper rim or edge downward.

$a^1$ represents the thick base, $a^2$ a handle, and $a^3$ a skirt standard or in other words, a circular standard depending from the thick base, and $b$ represents a partition across within the cup with an upper edge bent toward the sides of the cup and a center notch; the pocket or space formed between the partition and the walls of the cup being adapted to receive water, which when the cup is tipped over, is poured through the notch of the partition into the main portion of the cup for shaving purposes.

The thick base $a^1$ of the cup is perforated centrally and the perforation off-set, that is to say, the upper half of the perforation is large and the lower half appreciably smaller. As shown in Figs. 1 and 2, the upper part of the perforation may be hexagonal and as shown in Fig. 5, the upper part may be round. Where the upper part of the perforation is hexagonal it is adapted to receive the cake of soap $e$ and the slab $c$ of vitrified material; the slab $c$ being down into the perforation and the cake of soap passed down into the perforation on top of the slab.

Where the upper part of the perforation is round it is adapted to receive the round slab $c^1$ and the round cake $e^1$, but I do not in any respect limit my invention to the outline or shape of the slab or the outline or shape of the cake of soap, or the outline of the upper part of the perforation in the bottom of the cup. The perforation in the lower part of the thickened base of the cup is round and the walls interiorly threaded, and $d$ represents a cylindrical screw of vitrified material and appreciable area and adapted to fit the interior thread of this opening or perforation; $d^1$ at the lower end of the cylinder $d$ being a finger button or head by means of which the cylindrical screw $d$ is rotated in either direction.

As shown in Fig. 1, the slab $c$ is at the lowest point in the upper part of the perforation seated against the surface of the base and the cake of soap $e$ upon the slab, with the upper surface of the cylindrical screw $d$ resting against the under surface of the slab $c$. By turning the cylindrical screw $d$ as the upper surface of the soap wears away, the slab $c$ is raised with the cake of soap so as to keep the upper surface always even with the bottom of the cup.

When the cake of soap is used up it is preferable to remove the slab and the cylindrical screw and wash the same thoroughly, and as these are of vitrified material such as glass, porcelain or earthenware, it is a very easy matter to thoroughly wash the same and remove all particles of foreign matter and render the same as fresh, clean and wholesome as when absolutely new. The parts are then replaced with a fresh cake of soap ready for use.

I am aware that shaving cups have heretofore been devised of metal providing for a cake of soap in the bottom of the cup to be raised as used, but the same has been of complicated construction, substantially inseparable, insanitary and unclean, liable to clog and by moisture be covered with verdigris so as to be insanitary and substantially useless, whereas in the device of my invention every part being made of vitrified material and separable, may be most thoroughly and perfectly cleansed.

I claim as my invention:—

1. As a new article of manufacture, a shaving cup of vitirfied material having sides of downwardly increasing thickness and a thickened perforated base and having a skirt or circular standard extending down from the thickened base and elevating the cup, the perforation of said thickened base being off-set, a slab of vitrified material fitting within the upper part of the perforation which is also adapted to receive a cake of soap, and a cylindrical exteriorly threaded body movable vertically and centrally through the base of the cup for raising the slab and soap.

2. As a new article of manufacture, a shaving cup of vitrified material having sides of downwardly increasing thickness, and a thickened base with an off-set perforation therein, the upper part of said perforation being angular, with vertical walls, and the lower part circular and interiorly screw-threaded, a support member formed as a prolongation from the thickened base of the cup, a slab of vitrified material of angular outline adapted to fit the angular perforation, which portion is also adapted to receive an angular cake of soap, and a cylindrical exteriorly threaded body movable vertically and centrally through the lower circular portion of the aperture of the cup for raising the slab and soap.

Signed by me this 31st day of July 1909.

CYRUS ARNONE.

Witnesses:
A. H. SERRELL,
E. ZACHARIASEN.